C. H. CARTER.
CULINARY IMPLEMENT.
APPLICATION FILED OCT. 22, 1919.
1,378,522.
Patented May 17, 1921.
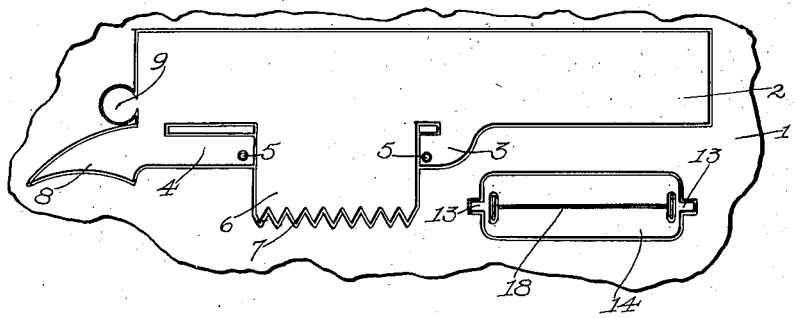
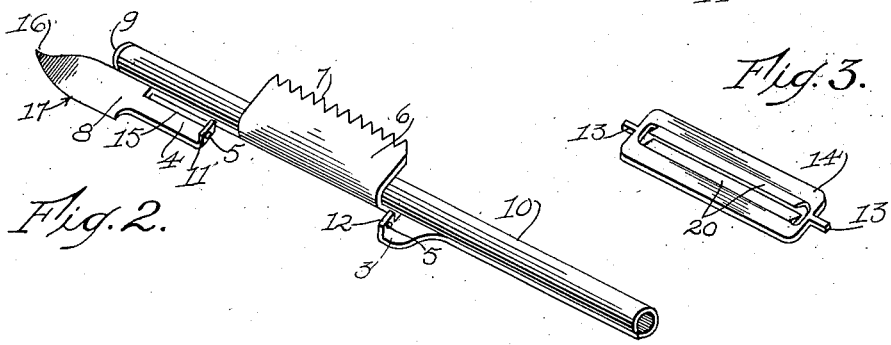
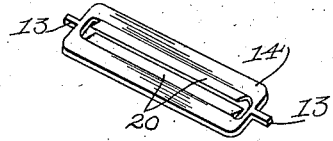
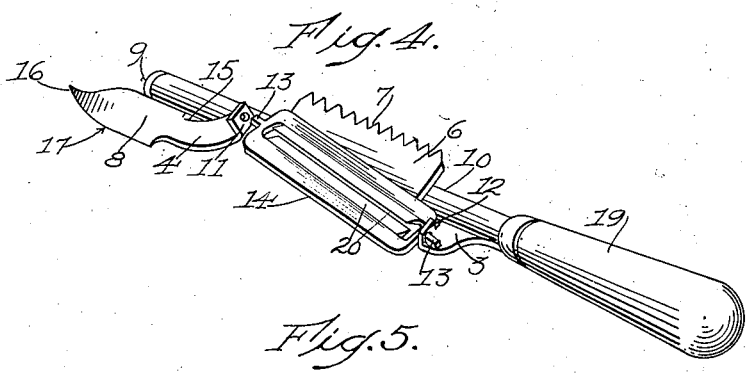
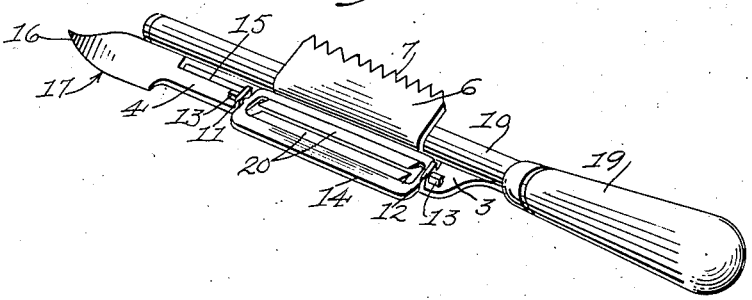
INVENTOR:
Charles H. Carter
BY
Chas. H. Chapman,
ATTORNEY.

UNITED STATES PATENT OFFICE.

CHARLES H. CARTER, OF BROOKLYN, NEW YORK, ASSIGNOR TO MONTAGU M. STERLING, OF BROOKLYN, NEW YORK.

CULINARY IMPLEMENT.

1,378,522.　　　　　　Specification of Letters Patent.　　Patented May 17, 1921.

Application filed October 22, 1919. Serial No. 332,489.

*To all whom it may concern:*

Be it known that I, CHARLES H. CARTER, a citizen of the United States, residing in the borough of Brooklyn, county of Kings, and State of New York, have invented a new and useful Improvement in Culinary Implements, of which the following is a description.

This invention has reference to culinary implements, and, particularly, implements adapted for paring or peeling fruit and vegetables of various kinds, and with which other useful operations relating to cuisine may be performed.

Among the objects of my invention may be noted the following: to provide a device or implement by means of which fruit and vegetables may be pared quickly, economically and with great facility; to provide a device of the character stated, the blade of which may be removed and reversed, so that the implement may be used by either a right or left-handed person, and, when removed, if desired, may be sharpened; to provide a device adapted to pare fruit and vegetables and also to be used to scale, or strip the scales from, fish; to provide a combination implement, having the uses set forth in the foregoing, made of a single piece of sheet metal, whereby it is economical to produce, cheap, strong and durable; and to provide an implement of the kind indicated capable of being stamped out of a single piece of sheet material and readily bent into the form required.

With the above objects in view, and others which will be detailed during the course of this description, my invention consists in the parts, features, elements and combinations thereof hereinafter described and claimed.

In order that my invention may be clearly understood, I have provided drawings wherein:

Figure 1 is a plan view showing a piece of sheet material such as tempered steel, or resilient metal of any kind, with the blanks, from which the implement of my invention is formed, shown stamped or cut therefrom;

Fig. 2 is a perspective view of the implement formed from the stamped or cut-out piece of material with the blade removed therefrom;

Fig. 3 is a perspective view of the reversible duplex blade which is likewise stamped out of a single piece of sheet metal, as shown in Fig. 1;

Fig. 4 is a perspective view of the implement with one bearing member thereof flexed and the blade shown positioned preparatory to removing or replacing it for the purpose of or after reversal, and for sharpening or repair;

Fig. 5 is a perspective view of the implement ready for use.

Referring to the drawings, the numeral 1 indicates the sheet of material from which the implement is stamped or cut, as shown in Fig. 1, and, in said figure, the handle and body portion of the implement blank is indicated by 2. Extending from the body portion are two slender strips 3 and 4, affording opposite bearings for the duplex blade shown in Fig. 3. The members 3 and 4 are each apertured, as at 5. The body portion is extended laterally at 6, to provide a device, presently described, and its free end is serrated at 7. The body portion is further extended at 8 and also has a rounded integral portion 9.

In producing the implement, as shown in Fig. 2, the blank 2 is rolled over a spindle or form to produce the cylindrical handle and body portion 10, which operation may be performed either before or after the circular member 9 is turned up into position. That is to say, the said circular member may be first turned up and the body portion rolled over it, or the body portion may be first rolled and the circular member turned up to plug the end of the cylinder, as shown in Figs. 2, 4 and 5. The serrated device 6 is then turned over upon the cylindrical portion 10, into its functional position so as to extend rearwardly at a right-angle to the handle and body portion. Then the ends of the strips 3 and 4 are bent at a right-angle to provide bearings 11 and 12 for the journals 13 of the duplex blade 14. The strip of the bearing 11 is much more extensive than its opposite member and is separated from the body 10 by the long slot 15. This enables the said bearing member to have considerable flexibility and resiliency, enabling it to be flexed as shown in Fig. 4, to not only insert the blade 14, but remove the same for reversal, for sharpening, or for substitution in the event of injury or breakage of the blade. The extension 8 of the implement is given a slight upward bend to elevate its point 16, and its edge 17 is sharpened, to enable it to gouge out the eye of, and cut, the potato, for example, or the core of an apple, or a decayed portion of the latter, etc. A handle 19 may be applied, as shown in Figs. 4 and 5. The serrated member 6 is for the purpose of removing the scales from fish or for any other purpose for which it may be found suitable.

As shown in Fig. 1, the blade 14 is stamped or cut from the sheet metal and its edges along the central slit 18 are bent in opposite directions to provide blades 20, which are sharpened to a cutting edge. The duplex character of the blade enables it to be used on both sides by swinging on its journals.

From the foregoing it will be seen that I have produced a very useful instrument having several functions, which can be made economically, as well as strong and durable, and which is adapted for use of either a right or left-handed person by simply reversing the blade. The blade stamped out of the sheet of material, as shown in Fig. 1, is of such form that it may be readily turned end-for-end and used either in a right or left-hand manner. When it is desired to reverse or remove the blade for any other reason the bearing strip 4 is flexed, as shown in Fig. 4, so as to release one of the journals. Replacement is accomplished in the same way.

Having thus described my invention, what I claim and desire to secure by Letters Patent is:

1. A culinary implement having a body portion and two journal bearings, one of which is resilient and adapted to be flexed out of normal position for the insertion and removal of a blade: and a cutting blade mounted in said bearings.

2. In combination with a culinary implement comprising a body portion and journal bearings, a removable and reversible duplex blade, one of said bearings being resilient and adapted to be flexed for removal of the blade.

3. A culinary implement formed of a single piece of sheet metal having two slender strips extending from one side thereof in alinement with each other, and one of said strips being longer than the other so that it may be readily flexed, said piece being rolled to form a handle and leave the strips projecting therefrom, and said strip extensions having each its free end bent at an angle to form a bearing for a cutting blade, and a cutting blade journaled in said bearings, the flexible bearing enabling said blade to be readily applied and removed.

CHARLES H. CARTER.